(No Model.)
M. WALLIS.
ADJUSTABLE DETACHABLE BICYCLE HANDLE.
No. 586,468.  Patented July 13, 1897.
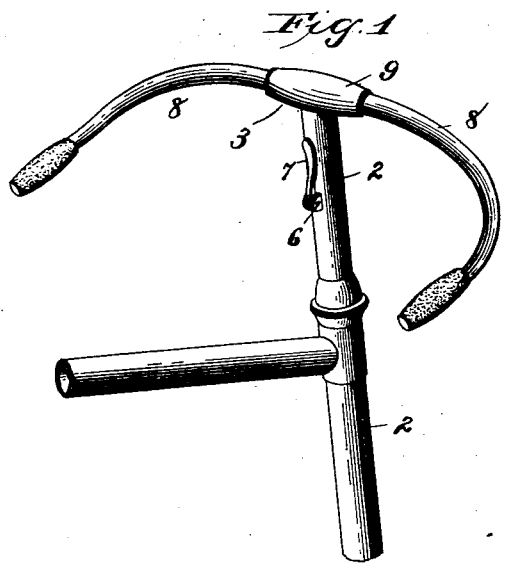
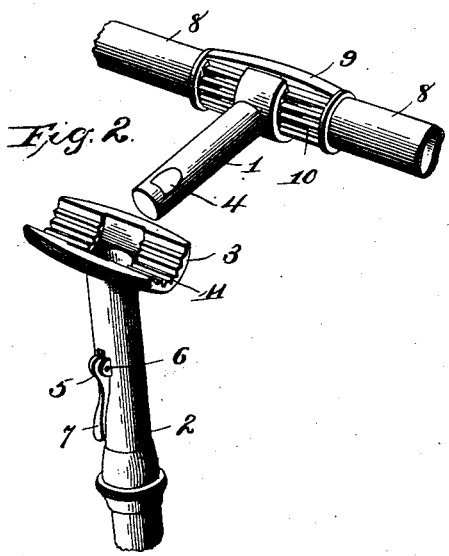
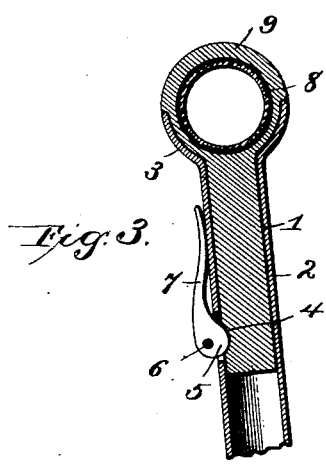
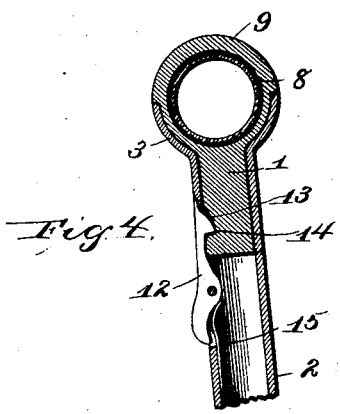
Witnesses
E. C. Wurdeman
J. J. Williamson
Inventor
Mounteney Wallis
By Geo. H. Holgate
Attorney

UNITED STATES PATENT OFFICE.

MOUNTENEY WALLIS, OF PHILADELPHIA, PENNSYLVANIA.

ADJUSTABLE DETACHABLE BICYCLE-HANDLE.

SPECIFICATION forming part of Letters Patent No. 586,468, dated July 13, 1897.

Application filed November 20, 1895. Serial No. 569,515. (No model.)

*To all whom it may concern:*

Be it known that I, MOUNTENEY WALLIS, a citizen of the United States, residing at Philadelphia, in the county of Philadelphia and State of Pennsylvania, have invented certain new and useful Improvements in Adjustable Detachable Bicycle-Handles, of which the following is a full, clear, and exact specification.

My invention relates to a new and useful improvement in handle-bars for bicycles or other vehicles, and has for its object to so construct and arrange such a device and the means for fastening the same to the steering-fork of a bicycle or other vehicle as to permit the ready adjustment of the handle-bar about the axis of its bearing and to allow it to be removed from the steering member of the vehicle to prevent said vehicle from being tampered with when the owner is absent and also to facilitate the housing of said vehicle.

With these ends in view the invention consists in the details of construction and combination of elements hereinafter set forth and then specifically designated by the claims.

In order that those skilled in the art to which this invention appertains may understand how to make and use the same, I will describe its construction and operation in detail, referring by number to the accompanying drawings, forming a part of this specification, and in which—

Figure 1 is a perspective of a portion of the steering member of a bicycle, showing my improved handle-bar attached thereto; Fig. 2, a detail perspective of the parts which constitute the fastening and adjusting features of my improvement; Fig. 3, a central vertical section of a portion of the steering member, showing the preferred construction in securing the handle-bar shank within said member; and Fig. 4, a slight modification of this means of securing.

Similar numbers denote like parts in the views of the drawings.

In the use of bicycles or similar vehicles considerable difficulty is experienced when the stationary and fixed handle-bar is used, in that the rider is unable to adapt the position of the handles to the character of road over which he is traveling, which places him at a disadvantage, as in climbing hills it is desirable to have the handles very much lower than when going downgrade or upon substantially level ground. A further disadvantage of the ordinary handle-bar is that in leaving a machine in public places it may easily be mounted and ridden away by others than its owner; but I have overcome these difficulties by the construction and arrangement of parts hereinafter described.

In carrying out my invention I use the ordinary rod 1, which is adapted to slide in the upper end of the forked tube 2. Formed with or secured to the upper end of this tube is a head 3, which constitutes half of the bearing of the handle-bar, as will be hereinafter set forth. In the lower portion of this rod is a cammed notch 4, into which the cam 5, pivoted at 6 to the fork-tube, is adapted to swing for the purpose of clamping the rod within the tube. This cam is provided with a lever 7 in order that it may be operated by hand.

8 represents the handle-bar, which passes through and is adapted to revolve in the housing 9, which latter, when matched to the head 3, completes a barrel-shaped casing, as shown in Fig. 1. A number of serrations 10 are embedded in the handle-bar 8, so that the housing 9 may slide thereon and leave a part of them to be engaged by the teeth 11, formed in the head 3, so that when the rod 1 is placed in the tube 2 these teeth and serrations coming into engagement will serve to prevent the handle-bar from revolving upon its axis, and the rod is secured in place against the tendency of these teeth and serrations to separate when strain is transmitted to the handle-bar by the cam 5 being turned to the position shown in Figs. 1 and 3, whereby it will engage the notch 4 and firmly hold said rod against upward movement. This cam is so constructed as to permit the rod to slip within its bearing in the tube without interference therewith when turned in the position shown in Fig. 2.

When it is desirable to adjust the handles either up or down from any given position, it is only necessary to swing the cam out of engagement with the rod and exert sufficient strain upon said handles to cause the teeth and serrations to disengage themselves, and when the handle-bar has been brought to the proper position again clamp the rod in its normal position by the proper swinging of the cam, and as these operations may be performed while the machine is in motion it will be seen that the position of the handles may be altered to accommodate the character of road over which the machine is being driven without dismounting.

When the machine is to be left temporarily in an exposed place, the handles may be carried with the owner by simply unlatching the rod and withdrawing the same from the tube. This will prevent any one not provided with the handle-bars from appropriating the machine by mounting and riding away, as no control would be had over the steering of the machine; also, by the removal of the handles the machine may be passed through a narrow passage-way, which would not be the case were the handles to project in the ordinary manner.

In the modification shown in Fig. 4 a latch 12 is substituted for the cam and the notch 13 so formed as to be engaged by the nose 14 of said latch. 15 is a spring secured within the tube and adapted to bear against the latch, so as to normally move its nose inward.

Other modifications might be made in the mode of securing the rod within the tube without departing from the spirit of my invention, and I therefore do not wish to be understood as confining myself to this exact construction.

Having thus fully described my invention, what I claim as new and useful is—

1. In a device of the character described a handle-bar having serrations formed therein, a housing fitting over the handle-bar having openings to expose the serrations, a stem secured to the housing, a hollow steering-tube surrounding the stem, a serrated head on said tube engaging the serrations of the handle-bars as and for the purpose described.

2. In a device of the character described a serrated handle-bar, a clamp for engaging said handle-bar consisting of a casing surrounding the handle-bar having a stem an opening on either side thereof, a hollow steering-tube to receive the stem having a head to fit in the casing and provided with serrations to engage the serrations of the handle-bar through said openings as and for the purpose described.

In testimony whereof I have hereunto affixed my signature in the presence of two subscribing witnesses.

MOUNTENEY WALLIS.

Witnesses:
S. S. WILLIAMSON,
ALLISON W. MCCURDY.